Nov. 29, 1927.  1,650,679
R. E. WOOLLEY
ELECTRIC SPEED INDICATOR
Filed Sept. 15, 1924
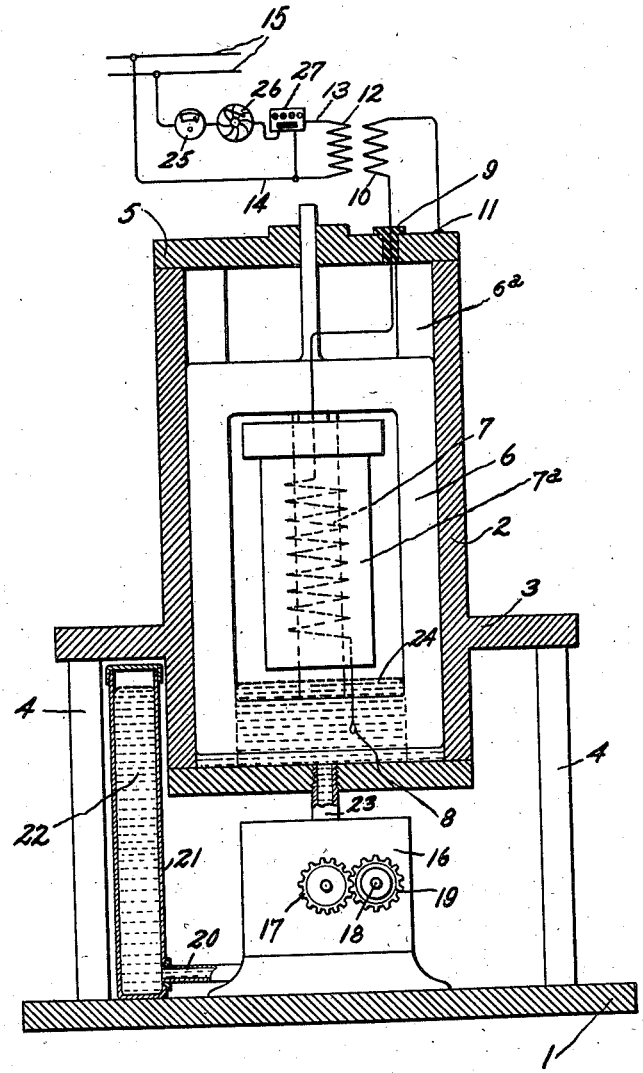
Inventor:
Rew E. Woolley,
by *[signature]*
His Attorney.

Patented Nov. 29, 1927.

1,650,679

UNITED STATES PATENT OFFICE.

REW E. WOOLLEY, OF SCHENECTADY, NEW YORK, ASSIGNOR, BY MESNE ASSIGNMENTS, TO BAILEY METER COMPANY, A CORPORATION OF DELAWARE.

ELECTRIC SPEED INDICATOR.

Application filed September 15, 1924. Serial No. 737,955.

The present invention relates to instruments for indicating the speed of rotation of shafts and has for its object to provide an improved instrument of this character.

For a consideration of what I believe to be novel and my invention, attention is directed to the accompanying description and the claim appended thereto.

In the drawing, the figure is a diagrammatic view of a speed indicator embodying my invention.

Referring to the drawing, 1 indicates a base upon which is mounted a casing 2, a convenient form of mounting being one wherein the casing is provided with a flange 3 supported on suitable posts 4. Casing 2 is closed by a cover plate 5.

Mounted inside of casing 2 is a transformer core 6 comprising three legs, the two outside legs being located in vertical grooves 6ª in the casing wall. On the middle leg is arranged a primary winding 7 which is embedded in a cylinder 7ª of suitable insulating material and which at one end is grounded on casing 2 as is indicated at 8. The other end of primary winding 7 projects out through an insulating bushing 9 in cover plate 5 and is connected to one terminal of a transformer winding 10, the other terminal of which is grounded on casing 2 as is indicated at 11. Transformer winding 10 forms the secondary winding of a step-down transformer which has its primary winding 12 connected by conductors 13, 14 to a source of alternating current of constant potential indicated by the lead wires 15. Primary winding 7 is thus connected to a source of alternating current 15 through the intermediary of a step-down transformer comprising windings 10 and 12. It is desirable that a voltage of comparatively small value be impressed on winding 7, while the voltage ordinarily met with is of the order of 110 volts or more, and the purpose of the step-down transformer is to provide a voltage for winding 7 of suitable value.

Mounted on base 1 preferably directly beneath casing 2 is a liquid tachometer 16 which may be of any suitable type. 17 indicates a gear wheel on the tachometer shaft through which the rotating element of the tachometer is turned. As is well known, such liquid tachometers comprise an impeller or other pump means which creates a pressure proportional to the speed of rotation, the pressure being measured in order to indicate the speed. In the present instance 18 indicates a shaft the speed of which is to be measured and it is shown as being geared directly to gear wheel 17 by a gear wheel 19.

The suction inlet of tachometer 16 is connected by a pipe 20 to a reservoir 21 which contains a supply of liquid 22 such as mercury, which liquid is a conductor of electricity. Reservoir 21 is preferably mounted on base 1 and projects up alongside the lower end of casing 2. The discharge side of tachometer 16 is connected by a pipe 23 to the bottom of casing 2.

The arrangement is preferably such that when the tachometer is not running the liquid in reservoir 21 and casing 2 stands at a level in line with the lower end of transformer winding 7, the liquid forming a ring around the lower end of the middle transformer leg as is indicated at 24. This represents the condition of zero speed.

Now, when shaft 18 is running, the tachometer is driven at a speed proportional to the speed of the shaft and pumps mercury from reservoir 21 up into the casing 2. This causes the level of the mercury in casing 2 to rise and a head of mercury will be established in casing 2 which balances the pressure created by tachometer 16. The mercury ring around the middle transformer core leg forms a closed secondary winding for the transformer comprising core 6 and primary winding 7 the resistance of which varies in accordance with the depth of the mercury ring. The current flowing in primary winding 7 will be proportional to the resistance of the secondary winding formed by the mercury ring so that as the mercury rises and falls in casing 2 the current flowing in primary winding 7 and hence in the circuit comprising lead wires 13, 14 will vary in accordance with the depth of the mercury ring. The current flowing in this circuit thus becomes a measure of the speed of shaft 18 and by providing suitable electrical measuring instruments such as an indicating ammeter 25, a curve drawing ammeter 26 and a watthour meter 27 in the circuit, the speed can be easily measured. These instruments may be calibrated to read directly in terms of shaft speed, and may be located at any suitable or desired point.

Reservoir 21 is made of a size so as to have a capacity such that the necessary quantity of mercury is provided for use in casing 2.

As is well known, a liquid tachometer of the rotating or pump type produces a pressure or head proportional to the square of the speed. On the other hand, an instrument as shown comprising a primary winding and a liquid ring forming a closed secondary winding when suitably proportioned and provided with a suitable external resistance, a thing which can be determined experimentally, produces a flow of alternating current in the primay winding 7 and hence in the circuit comprising conductors 13 and 14, proportional to the square root of the height of the liquid ring, i. e., proportioned to the square root of the pressure. This means, therefore, that the current flowing in the primary transformer winding and in the indicating circuit will be directly proportional to the speed of shaft 18. As a result, the current flowing in the indicating circuit can be integrated directly in terms of speed by a suitable integrating watt hour meter. This, of course, is of distinct advantage and great importance in an apparatus of this character.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

In an electric speed indicator, the combination of a base, a casing supported on the base in vertical, spaced relation thereto, a transformer core in the casing, a primary winding on the core, an alternating current electric circuit connected to said primary winding, an electrical measuring instrument in said circuit, a reservoir located on the base directly adjacent to said casing, a liquid in said reservoir, a liquid tachometer mounted on said base directly beneath said casing, a conduit connecting the discharge side of said tachometer to the bottom of said casing, and a conduit connecting the admission side of said tachometer to the bottom of said reservoir whereby said liquid tachometer serves to pump liquid directly into the bottom of said casing and to establish therein a head proportional to the speed of the tachometer, said liquid in the casing forming a closed secondary winding for the transformer.

In witness whereof, I have hereunto set my hand this 12th day of September, 1924.

REW E. WOOLLEY.